(12) United States Patent
Burnett et al.

(10) Patent No.: US 7,454,788 B2
(45) Date of Patent: Nov. 18, 2008

(54) METHOD FOR ADDING AND ENFORCING ENHANCED AUTHORIZATION POLICY ON DEVICES IN COMPUTER OPERATION SYSTEMS

(75) Inventors: Rodney Carlton Burnett, Austin, TX (US); Timothy Simon Bartley, West Burleigh (AU); Michael Powell, Carrara (AU)

(73) Assignee: International Business Machines Corporation, Armonk, NY (US)

( * ) Notice: Subject to any disclaimer, the term of this patent is extended or adjusted under 35 U.S.C. 154(b) by 1546 days.

(21) Appl. No.: 09/843,069

(22) Filed: Apr. 26, 2001

(65) Prior Publication Data
US 2002/0162012 A1 Oct. 31, 2002

(51) Int. Cl.
*G06F 21/00* (2006.01)
(52) U.S. Cl. .................... 726/17; 726/21; 713/167
(58) Field of Classification Search ............. 713/202, 713/200, 164–167; 709/229; 726/1, 4, 17, 726/21; 711/163; 707/9
See application file for complete search history.

(56) References Cited

U.S. PATENT DOCUMENTS

| | | | | |
|---|---|---|---|---|
| 4,919,545 | A | * | 4/1990 | Yu ............................. 713/167 |
| 5,113,442 | A | * | 5/1992 | Moir ........................... 713/167 |
| 5,283,830 | A | * | 2/1994 | Hinsley et al. ................. 707/9 |
| 5,414,852 | A | * | 5/1995 | Kramer et al. ............... 718/104 |
| 5,479,612 | A | * | 12/1995 | Kenton et al. ............... 713/200 |
| 5,483,649 | A | * | 1/1996 | Kuznetsov et al. .......... 713/200 |
| 5,859,966 | A | * | 1/1999 | Hayman et al. ............. 713/200 |
| 6,112,263 | A | * | 8/2000 | Futral ......................... 710/37 |

OTHER PUBLICATIONS

P. Galvin et al., Applied Operating System Concepts, First Edition, "Chapter 12: I/O Hardware", section 12.3, pp. 412-415; section 12.5 I/O Request Handling, pp. 424-427; "Chapter 20: Programmer Interface", section 20.3.1 File Manipulation, p. 627.*

(Continued)

*Primary Examiner*—Gilberto Barron, Jr.
(74) *Attorney, Agent, or Firm*—Jeffrey LaBaw; Darcell Walker

(57) ABSTRACT

In this invention, when security policy is attached to a file, a device protection manager is given the protected file's name. If the file is a special device file, then the device manager records the device specification in a device database. When a device access occurs, the device specification is extracted from the special device file used in the access. This extracted device specification is then used to search the device database. If a matching device specification is found in the database and the accessed device file has the same name as the protected resource, then authorization policy rules on that resource determine the access. If the match is a different device file name from the protected file name for the same device, then the search continues until the exact accessed device is found or until all device specification matches are found. In the absence of an exact device file match, all the matching device files are presented to the external security manager for authorization checking and the most restrictive outcome prevails.

19 Claims, 6 Drawing Sheets

OTHER PUBLICATIONS

A. Silberschatz et al. Operating System Concepts, "Chapter 11: File-System Implementation", section 11.1.1 File-System Organization, pp. 384-385.*

T. Hein et al. UNIX System Administration Handbook, "Chapter 7: Devices and Drivers", pp. 96-99.*

"A Basic UNIX Tutorial: The Unix Filesystem", Jan. 9, 1996, Idaho state university webpage tutorial, http://www.isu.edu/departments/comcom/unix/workshop/fstour.html.*

"Exactly What is a Driver", OSR Online, May 24, 2003, http://www.osronlie.com/custom.cfm?name=articlePrint.cfm&id=233.*

* cited by examiner

METHOD FOR ADDING AND ENFORCING ENHANCED AUTHORIZATION POLICY ON DEVICES IN COMPUTER OPERATION SYSTEMS

FIELD OF THE INVENTION

The present invention relates generally to enhancing the security protections on accesses to devices on computer operating systems. More specifically, this invention describes a technique in which a defined authorization policy external to the native operating system restricts access to system devices regardless of the method of access and controls the creation of new access paths to a system device.

BACKGROUND OF THE INVENTION

The file is the fundamental object in a computing system for representing system resources. This representation holds true for attached hardware devices and virtual "pseudo" devices that are represented and accessed through a specialized file type known as a "special device file". The device file acts as the portal to the device and its underlying functionality. This type of file contains no data, but has as part of its attributes, information describing the device. This device information is a device specification, which contains a major and minor number. These values act as indexes or pointers into internal data structures within the operating system. These data structures contain the specific device implementation methods and device properties. Since the special device file is just a redirector to the system device, there can be multiple device files on a system for a given device.

In a typical computing system, device security is limited to native operating system protection mechanisms. This protection is usually file mode bits placed on the special device files. In addition, some device method implementations may perform additional security such as only allowing root access. Often however, the device itself is void of any security policy and relies on the protections of the special device file. If multiple special device files exist for a device, then the security is dependent on which special device file is used in the access. One device file can have strict security and another device file may not have security. The creation of special device files is usually limited to the root user or members of a privileged group. Some environments demand finer levels of security controls on devices and seek to limit the authority of the native privileged user(s). For example, it may be desirable to prevent the creation of alternate device files for a device; even by the local root user. In addition, there may be a desire to have specific controls over which users can use a device. For example, preventing a non-approved user from writing data on a floppy disk drive, which is otherwise public with native security. In the presence of multiple special device files, the most conservative security approach would take into account all the device files, and apply the most restrictive protection. These described capabilities are not present in standard operating systems. An external security manager could enforce such policy on special device files and ultimately on the system devices they represent. The security specifies how the devices are identified and how access via alternate device files to a device are detected and enforced. This detection is possible even if alternate device files are not registered in the externally defined authorization policy.

There is a need for a file system security means that can identify special device files that represent protected system devices. This security means should be able to detect all special device files that represent a specific system device. The security means should have the ability determine whether a special device file representing a protected device is listed with the security means. This security means should be able to detect access attempts to protected system device through special device files that represent protected system devices but are not listed with the security means. This detection should result in enforcement of the protections placed on the accessed system device when the attempted access to the device is through a special device file for which protections where not registered with the security means.

SUMMARY OF THE INVENTION

It is an objective of the present invention to provide a method for controlling access to named objects in a file system.

It is a second objective of the present invention to provide a method for associating external attributes defining authorization policy to named objects in a file system.

It is another objective of the present invention to recognize the existence of an associated external device file authorization policy and provide for the processing of that policy at the time of access to the device.

It is a fourth objective of the present invention to provide for the association, recognition, and processing of external attributes utilizing device specifications contained in the device file.

It is a fifth objective of the present invention to provide a technique to prevent the creation of new special device files defining alternate access paths to a protected device.

It is another objective of the present invention to allow for the processing of the externally defined policy by a resource manager based on associations to the original name without requiring the resource manager to have knowledge of the underlying association and recognition techniques for devices.

This invention describes a method for file system security through techniques that control access to the file system resources using externally stored attributes. This invention accomplishes the described objectives in file system security by creating an external database containing auxiliary attributes for objects in the file system. This solution incorporates techniques and algorithms for attribute attachment, storage and organization of the associations to these attributes, and subsequent recognition of attached attributes. In this approach, the attributes would define authorization policy for controlling access to objects in the file system. Such a solution would require techniques for associating the defined policy with file system objects, detecting accesses to the objects, locating the appropriate attributes at access time, and then processing the attributes to produce an access decision for granting or denying access to the accessed resource.

Administratively, the most convenient technique for defining authorization rules for a file system object is to associate the attributes with the object's fully qualified common name. This common name is also known as the path name to the file. UNIX file systems, for example, provide a hierarchical name space for constructing object names. For example, a file called mydata might have a fully qualified path of /home/john_doe/data_files/mydata. This path is the most recognizable representation of the object and the most convenient description for an administrator to use when defining new attributes for the object. Therefore the technique for associating (or attaching) attributes should support using the object's fully qualified pathname.

Recognizing and locating externally defined attributes for file system objects at the time of object access pose significant technical challenges. Accesses occur through a set of available programming Application Programming Interfaces ("APIs") that provide several ways to identify the object being accessed. For many APIs, the name of the object is provided. However, this name is often not the full path name starting from the top or "root" of the file hierarchy. Instead, the name is relative to a "current directory" that is tracked for the calling application by the native operation system. UNIX file systems also commonly contain support for creating alternate names to an object using symbolic or hard links. This provides alias names to the same object. A symbolic link might allow /home/john_doe/data_files/mydata to be accessed as /u/jdoes_data/mydata. These variations make it difficult to locate the externally defined attributes using the provided name at the time of access. There are also APIs that do not take a pathname as input. Instead they take an integer number known as a file descriptor, which was obtained in an earlier name, based function. It is desirable to intervene in and enforce policy on these APIs as well. This enforcement is further complicated in the case of devices where a specialized file system resource type known as a special device file is used to access devices. The special device file contains within its attributes, the information needed by the underlying operating system to find, and perform operations against the device. The operating system allows multiple special device file resources to exist in the file system name space which all have the same device specific information in their attributes. In effect, multiple file system access paths are available to access the device. This situation is creates a set of alias names to the device in addition to the first created special device file that may be considered the primary access path to the device.

The method of the invention assumes there is a security manager and mechanism present for defining, attaching, and evaluating external authorization policy to file resources based on the file's path name. An example file name would be: /dev/floopy0. In this invention, when security policy is attached to a file, a device protection manager is given the protected file's name. It then retrieves the file's attributes to determine if the file is a special device file. This retrieval could occur through one of several methods including a stat() call or an internal OS service such as vn_getattr(). If the file is a special device file, then the device manager records the device specification (major and minor number) in a device database. This processing occurs for all files, which have attached policy. When a device access occurs, the device specification is extracted from the special device file used in the access. The access may be an attempt to open the device for reading or writing, or perhaps an operation to change ownership or permissions on the special device file. The device specification is then used to search the device database. If a matching device specification is found in the database and the accessed device file has the same name as the protected resource, then authorization policy rules on that resource determine the access. If the match is a different device file name from the protected file name for the same device, then the search continues until the exact accessed device is found or until all device specification matches are found. In the absence of an exact device file match, all the matching device files are presented to the external security manager for authorization checking and the most restrictive outcome prevails.

In addition to controlling device access through special device files, the present invention also has operations to monitor attempts to create new device files in order to catch these attempts to create alternate "less secure" access paths to the device. Attempts to create a new device file are treated as follows. First a check occurs to see if policy allows the creation of the new device file based on its name. If access is granted, then additionally a search occurs for existing protected device files looking for a device specification match. All matches are collected and all must grant read, write, and rename permissions indicating that creation of a new "alias" device file name for the device is allowed. This approach allows the policy to enforce the creation of special device files for device at a detailed level and allows detection and protection of device accesses through device files that may not be registered in the policy.

DETAILED DESCRIPTION OF THE DRAWINGS

The present invention is described in the context a UNIX operating system. As previously described, in a UNIX operating system, there can be more than one special device file that can refer to a system device such as a tape drive. As a result, many device files can have the same device specification as their attribute. This situation means there can be multiple ways to access a system device. For example, an access for a special device file, such as a tape drive, could be: /dev/tapedrive0 or /devices/defaultTapeDrive. Although there are multiple file path names or file access paths, some of the paths may not be protected with equivalent native security controls in the form of permissions on the special device file. These permissions govern the access to system devices through the given special device file. With a tape drive device, there may multiple special device files that represent ways to access the tape drive. The native security permissions may have only been set properly on a subset of these special device files and thus properly protected. Access to the tape drive through one of the other special device files might bypass the security established to protect access to the tape drive device and thereby compromise the intended security policy for that device. The purpose of the techniques of the present invention is to recognize accesses to a device, which has been protected in externally defined security policy using one or more of the special device file paths to the device. Those accesses may occur through either the paths defined in the protections or through special device file paths that were not specifically protected. For those accesses, the protections on the device are evaluated and enforced.

Figure 1:
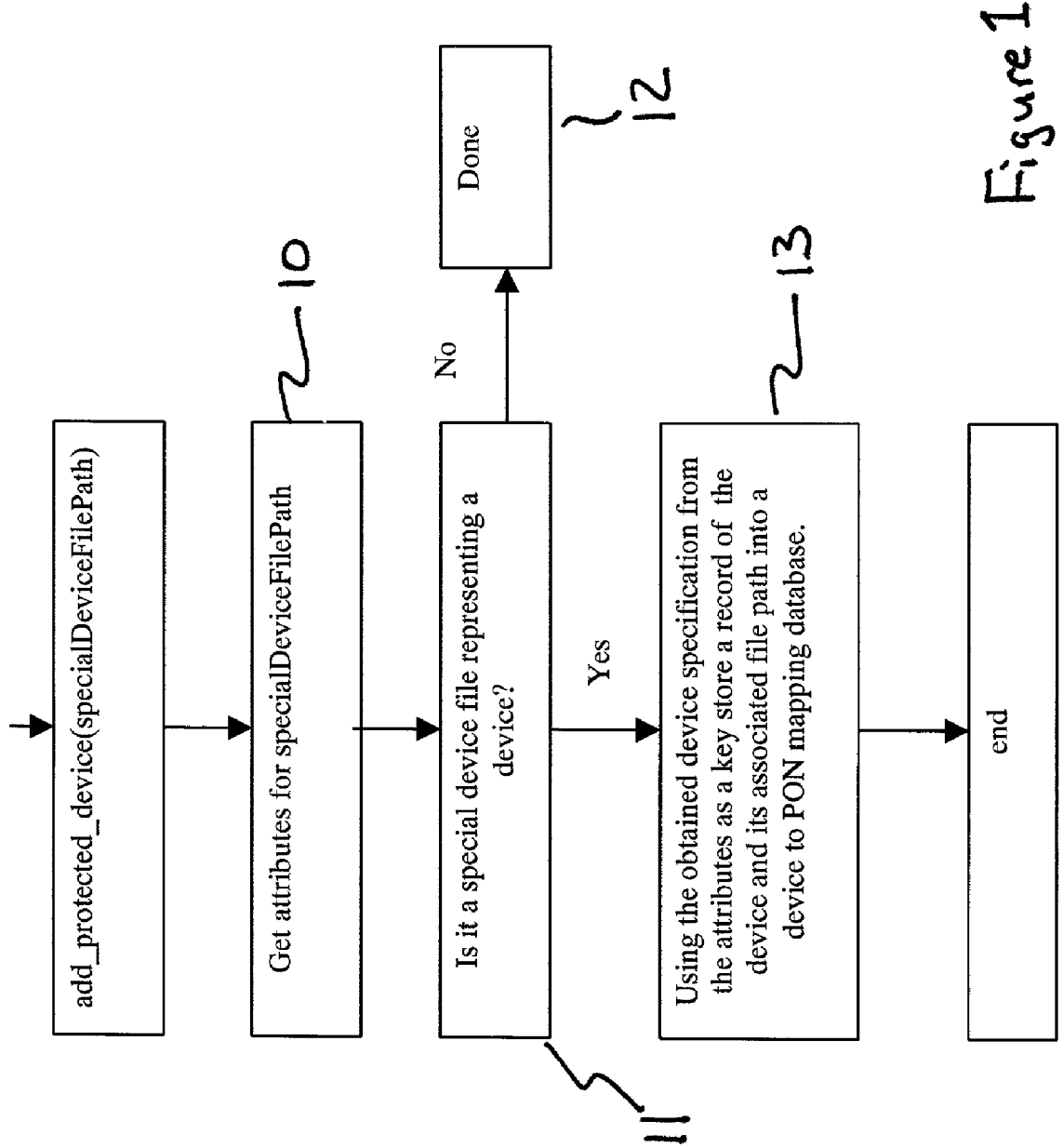
FIG. 1 is a flow diagram of the steps involved in processing an authorization policy record for a device using the full file path name to the device.

Referring to the techniques in the present invention, the initial task is to create a mapping database. FIG. 1 illustrates a set of steps in a technique for processing an authorization policy record for a device and storing that record in a mapping database. This mapping database contains records of protected special device files and device specifications related to a system device. In UNIX operating systems, user or application program is allowed to access devices in the same manner as accessing actual files. The authorization policy for devices is defined in terms of the name of the file path to those devices. This information would be stored, preferably as records, in the architecture where the master security policy resides. This first figure describes the steps for taking a record of security policy for the device to be protected that is named by a file name and processing that device and file name into a device record, for storage in the mapping database.

The first step 10 is to get the attributes for the file name that has some form of protection or external attributes on it. The native operating system contains services that allow one to get these file attributes for a file on the system. After retrieving these file attributes, the next step 11 is to determine based on the retrieved file name attributes whether this file name is for a special device file. The device file is a special file that has a sole purpose of representing a device. If the retrieved file name is not for a special device file, the file is not for a special device, therefore security rules protecting access to device do not apply to this file. The technique terminates in step 12. If the retrieved file name is for a special device file, the process moves to the next step 13 and stores the device specification, which is some type of numerical value that specifies the actual hardware device that the file represents. For example, a numerical value could be two integer numbers, a major and a minor number that are arrays into indexes in a data structure that lives inside the operating system that has more information about the device that includes the specific methods for communicating with and operating the device. This device specification is a unique representation for getting to that device. There is only one device specification for each hardware device on the system. This device specification and the name used to refer to that device in a mapping database that maps between device specifications and path names to the associated special device file which are also referred to as protected object names (PONs).

Figure 2:
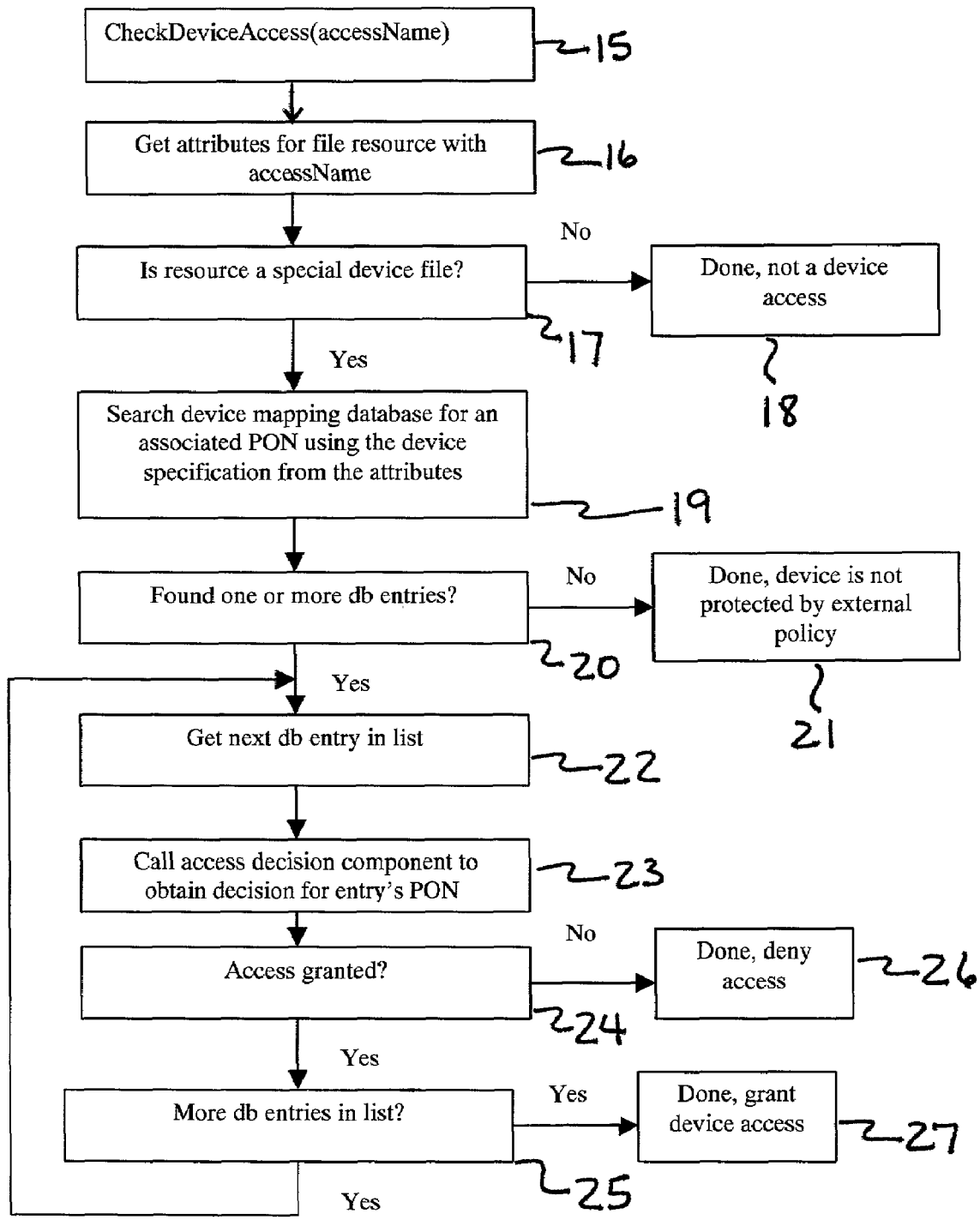
FIG. 2 is a flow diagram of the steps to check for the presence external authorization policy and obtain an access decision when a device access is attempted.

In operation, a user or application makes an access attempt to a device by operating on a special device file. When this access attempt occurs, it is detected and there is an initiation of the device security techniques of the present invention. For each device access attempt, there is a determination of whether to grant the access request. In this process, in order to make grant authorization determination, there must be an assessment of the security rules for the requested device and the special device files that represent that device. Referring to FIG. 2, in the process of considering an access attempt to a system device through a special device file, the first step 15 is to obtain the name of the special device file used in this access attempt. This file name could be full path name beginning at the root of the file system name space (e.g. /dev/tape0) or a relative path name (e.g. /tape0). Once the file name is secured, the next step is to get the attributes for that file resource. The attributes contain information about the file including the file system resource type, step 16. From the file attributes, there can be a determination of whether the file resource is a special device file, step 17. If the determination is that the file type is not a special device file, then this technique does not specifically apply to the file resource because this technique has a primary application for security of system devices and special device files. The conclusion would be that in this file access attempt, there is not a question of device or device file security. The technique would terminate in step 18. If the result of step 17 were that the file type is a special device file, then the device and device file security steps of this technique would apply. In this case, the next step 19 would be to search the mapping database created in FIG. 1 for all of the special device files in the database that represent the device that is the object of this access attempt. This step generates a list of device files in the database that refer to the requested system device. Step 20 is a review of the results of step 19 to determine the number of database entries that are device files to the desired system device. If the search found no database entries, then the process moves to step 21. This result would mean that the device access attempt is to a device that is not protected by an external security. At this point, the technique would terminate. If the search did generate database entries, this would mean that there are some protected device files for the desired device and that the system device does have some level of protection on the device. The next step 22 would be to get the first entry of the list and to determine whether to grant access to the system device based on this special device file. To make this determination, there would be a call to the access decision component of the security manager. The decision component contains a list of the protected system devices and the designated special device files representing this device. In step 23, for the first file list entry, the decision component of the security manager will determine whether this user or application making the present access attempt would have access to the device through the security rules for the device file path (PON) associated with this file list entry. If the decision is that this access attempt would be granted under the security rules associated with the present file list entry, step 24, then the process determines whether there are more entries in the file entry list, step 25. If there are more entries, the process returns to step 22 and repeats the steps 22 through 25 for the next file list entry. If the determination in step 24 is that there would be no access grant for the present access attempt under the security rules for the current file list entry, the technique would deny the access attempt, step 26 and the process ends. If the present file access attempt would be granted under the security rules of each file list entry, then the authorization decision engine would grant access to the file device even though the particular device file used in the present file access attempt, even though that device file is not protected, step 27. The feature of this technique is that it requires all special device files for a particular system device listed with the security manager must grant access in order to grant an access request to that system device. The purpose of this technique of the present invention is to identify all unprotected special device files to a protected system device and extend a form of security over these device files even though these files are not formally listed with the security manager. The objective is to apply the most conservative protection to the system device. To accomplish this conservative protection during a device access attempt, this invention seeks out all special device files to a system device and requires that a device access attempt through an unprotected device file meet the protection of each special device file defined in the security policy in order to permit the requested access to the device.

Figure 3:
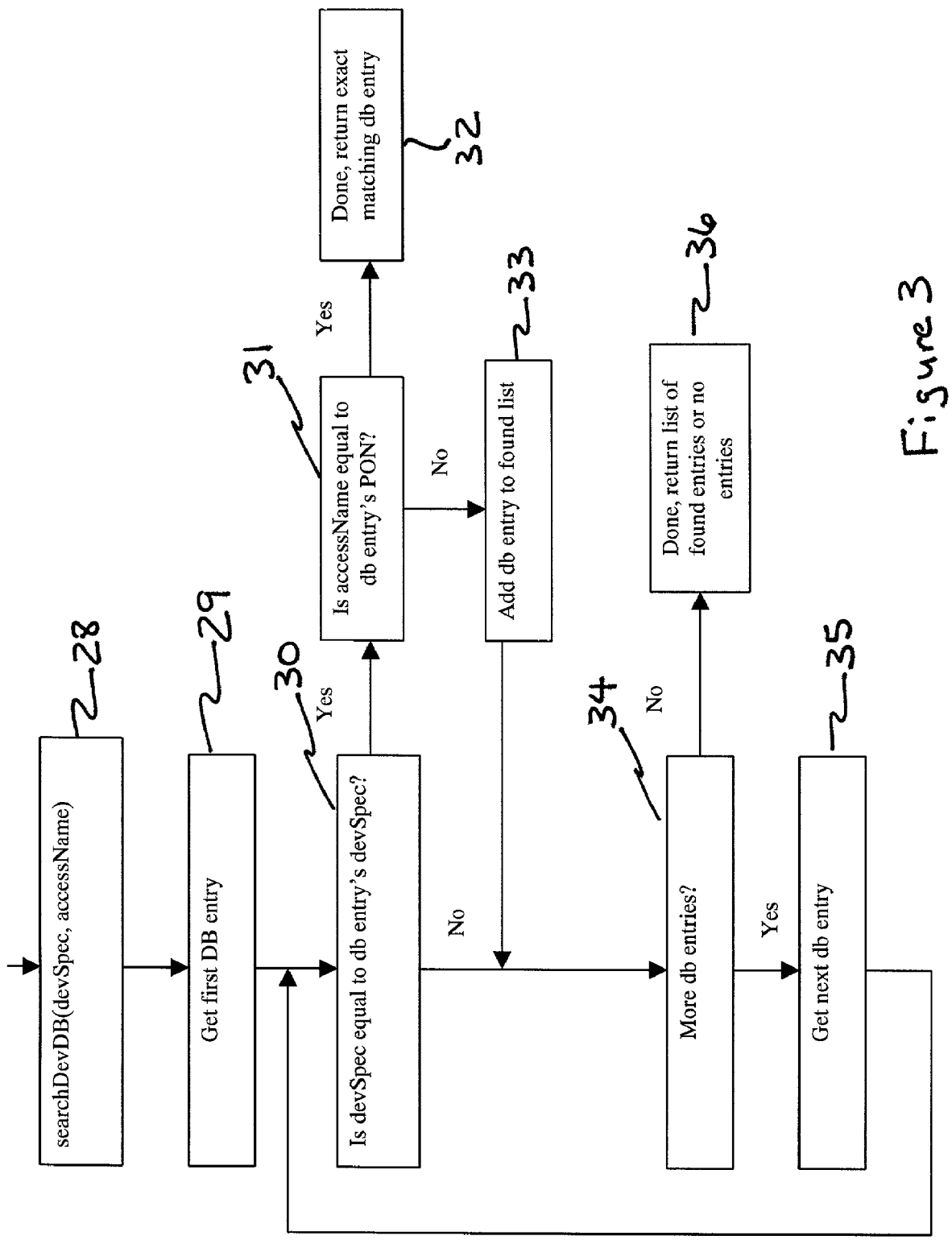
FIG. 3 is a flow diagram of the steps to search a database containing mappings of device descriptor specifications to device file path names.

FIG. 3 illustrates the steps involved in searching the database containing mappings of device descriptor specifications to device file path names (PONs) as described in step 19. The search uses the device specification (for the file name being used in this device access attempt) to perform the search. As described in FIG. 2, there is a file name for the device for which access is desired and there are file attributes, which include a device specification, for that file name. The search will be of the device database using this file name of the present device access attempt, Step 28. In this technique, the search begins, in Step 29, by getting the first entry in the mapping database generated in FIG. 1. The next step is to determine whether the device specification for the file named in the access attempt is the same as the device specification for that file entry in the mapping database, Step 30. If the device specifications are the same, the technique proceeds to Step 31 where there is a determination of whether the file named in the access request is equal to the protected object name. At this point, since the device specifications for the access file and database file entry are the same, the next question is whether the file names are the same. If the access file name and the protected object name are the same, there is an exact match between the device access file name and the protected device file name in the mapping database shown in Step 32. If the access file name does not match the protected object name, the process moves to Step 33 where that database entry is added to a list of found files that have equal device file specifications. The next step is to determine whether the present database entry is the last entry in the database, Step 34. If there are other entries, Step 35 retrieves the next database entry and the technique returns to Step 30 and that portion of the process repeats for the next entry. In Step 34, if there are no more entries in the database, this technique of FIG. 3 returns a search result to Step 19 of the technique of FIG. 2. This search result contains a list of protected special device files (PONs) that represent the system device that is the object of the present device access attempt, Step 36.

In addition to controlling access to system devices through special device files known as aliases that are listed in the security policy, another aspect of the invention is its ability to limit the creation these special device files. As previously mentioned, these alias device files are alternate ways to access a system device and in terms of a protected system device, the alias device file is potentially a way to avoid the security placed on that system device or at a minimum increases the complexity in the security processes for the represented device. Presently, in standard computing systems, there is a lack of robust means to control the creation of special device files for any device. As an example, there is a special device file that represents a tape drive device. This device file has security placed on it. The desire would be for any access attempt to that tape drive would go through that device file and the security on that device. However, if on the same system, an alias device file were created to the tape drive device, there would potentially exist an unsecured means to access the device natively. The only information needed to create a device file to a device is the device specification. This device specification is easily obtainable information. It is therefore a good practice to control the creation of new device aliases to avoid administrative confusion and avoid potentially created a security exposure when the described sample external security manager of the present invention is not actively monitoring and enforcing accesses on the system.

Figure 4:
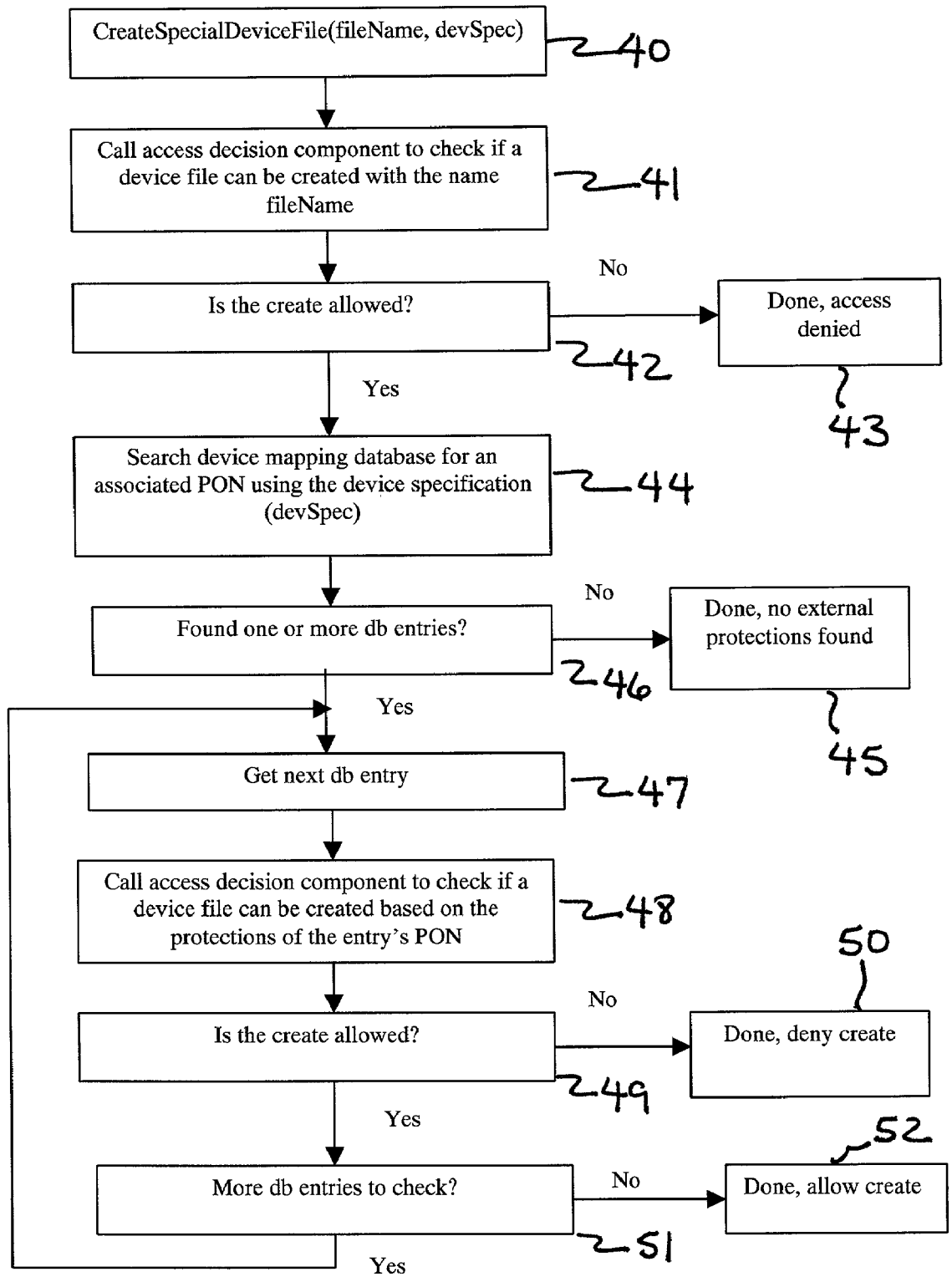
FIG. 4 is a flow diagram of the steps to check for the presence of external authorization policy and obtain an access decision when an attempt is made to create a new special device file for accessing a device.

FIG. 4 illustrates the steps to check for the presence of external authorization policy and obtain an access decision when an attempt is made to create a new special device file for accessing a device. In step 40, the inputs used to perform this check are the file name and the device specification that will be used to create a special device file. In step 41, the technique inquires of the authorization security engine whether there can be a device file created with the proposed name. As part of this inquiry, the authorization engine would receive the proposed file name and return a decision whether to allow the creation of a special device file having that particular file name. The decision would be based on the rules established for creation of a device file for the associated system device, step 42. If the authorization engine says "No", the process denies the device file creation request, step 43. If the decision is that there can be a special device file having the desired file name, the next step 44 is to search the device mapping database using the inputted device specification from step 40 to determine whether there are any entries in the database that protect that device file specification. This operation is a comparison of the inputted device specification to the device specification in a database entry. If the search does not result in database entries that protect the device file specification, Step 45, then the device has no external security protection on it and the creation of a special device file to the device is allowed. If the search does result in database entries that protect the device file specification, the first entry of the search result is retrieved, step 47. The next step 48 is to call the security authorization decision engine to determine whether the request has permission to create a new special device file on the protected device. The decision is based on whether the requester has read, write and rename permissions for that system device 49. If there are no permissions for the system device, the decision will be to deny the creation of the new special device file 50. If there is permission to create this special device file, there is a retrieval of the next entry in the database 51 and the process returns to step 47. If there are no more entries, the device file request is granted, Step 52.

In summary, the present invention has several features that will enhance the security of computer file systems. The first of these features is the ability to associate the existence of externally defined authorization policy against a device based on a given path name known as a protected object name (PON) to the special device file for the device. A second feature of this invention is the ability to recognize the existence of defined external policy for a device at the time of device access and obtain the PON used in the policy definition. A third feature of the invention is the ability to recognize the existence of defined external policy for a device regardless of the special device file used to access the device when multiple special device files exist for a given device. The next feature of the invention is the ability to prevent the creation of a new special device file for accessing a device based on externally defined authorization policy. This invention has the ability to obtain an access decision during a device access or special device file creation with the protected object name that was used to define the authorization policy. Finally, in this invention, by presenting the protected object name (PON) to the decision component, the authorization manager implementation is isolated from specifics of the device association techniques at the point of enforcement.

Figure 5:
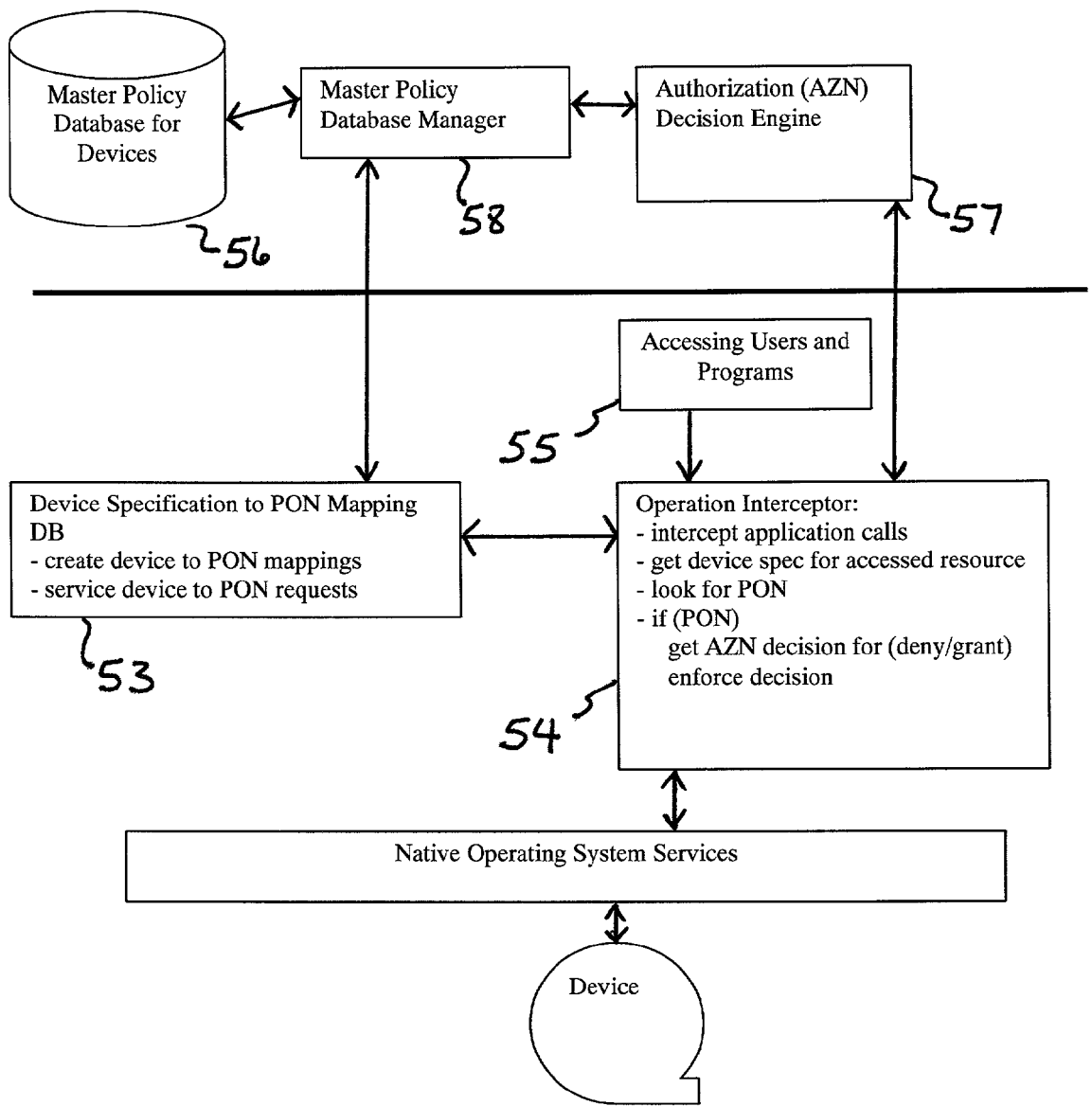
FIG. 5 is a block diagram of the high-level architecture relationship between an authorization manager, the native operating system, and algorithms of the present invention.

FIG. 5 illustrates the high-level architecture relationship between an authorization manager, a file system, and techniques of the present invention. In the architecture, Box 53 contains the device file specification to protected object name (PON) mapping database. Relevant algorithms would be the ones that retrieve device file attributes for the device file making the access attempt and that create a mapping to the PON and for a device file specification. Box 54 contains the operation interceptor component of the authorization security manager that would intervene in operations accessing a device that has security placed on it. This component would examine the device specification-to-PON mapping database and determine if the accessing device file has protection it. If the special device file accessing the device does have external authorization policy defined on it, this operation interceptor would grant or deny access to the system device. Box 55 represents the applications that run on the system and users of the system that are accessing the protected system devices through the special device files. Box 56 is the database location where the authorization policy and security rules reside.

This database location could be a variety of places such as on a network computer or on the same system that enforces the rules. Conceptually, there is some medium that actually holds all of the rules. Box 57 represents a security access system decision engine. In this decision engine, logic actually exist that would take the input information and other information related to the access request and determine whether to grant the access request. This authorization decision engine at the implementation level is application dependent.

In this invention, the technique allows the policy to be defined in terms in human readable names called PONs, for special device files that represent devices. Box 56 only pertains to security rules in terms of these file names, the name that describes something. The Box 50 takes those names and translates the names of files into very unique descriptions of their represented devices, as they exist on the system. Box 57 gets a name and information about the accessor and determines whether to grant access based on the security rules for these human generic file system names (PONs). Boxes 56, 57, and 58 do not necessarily know that they are protecting special device files or the details of how these special device files operate.

Figure 6:
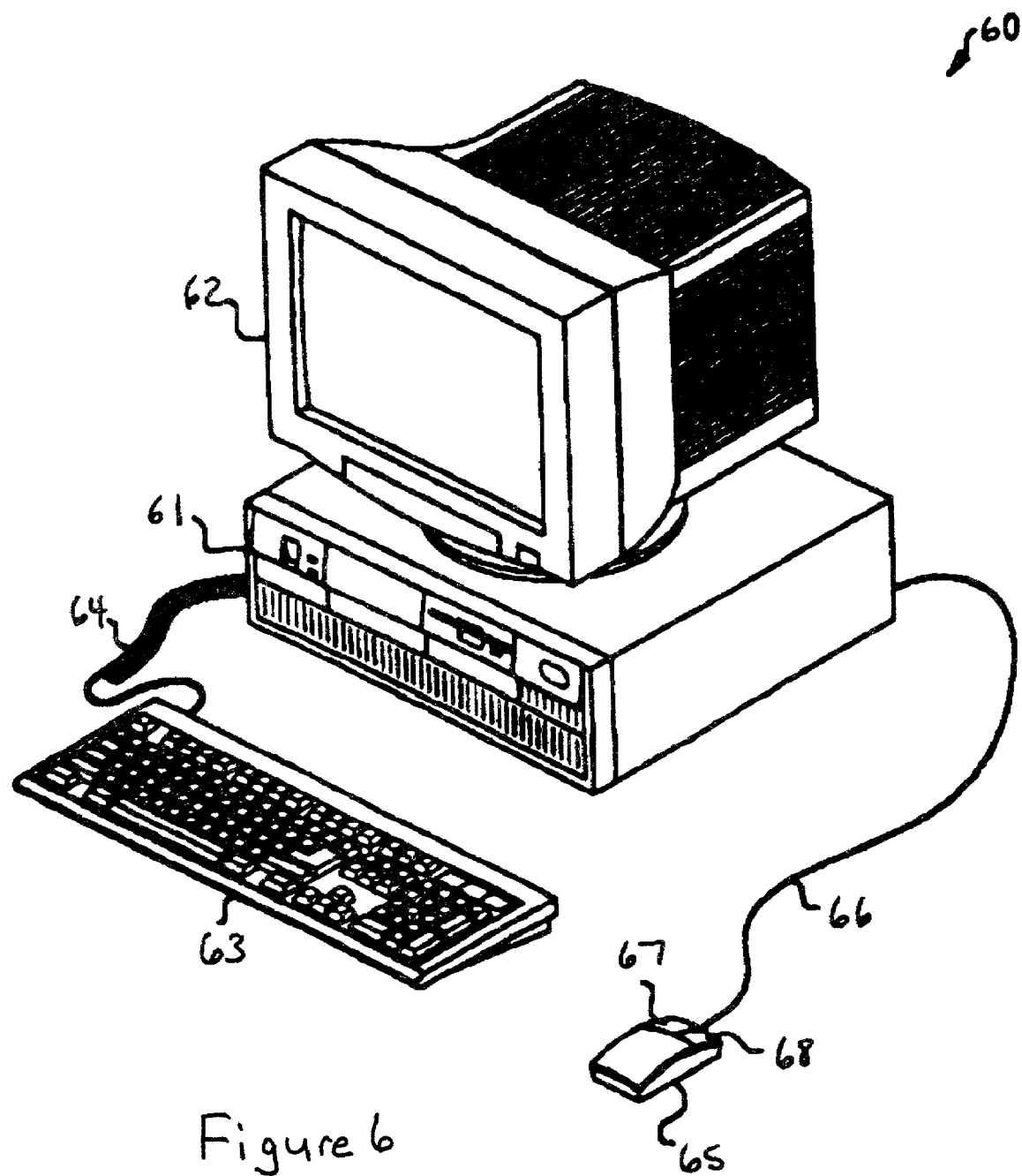
FIG. 6 is a pictorial representation of data processing system 60 which may be used in implementation of the present invention.

FIG. 6 depicts a pictorial representation of data processing system 60 which may be used in implementation of the present invention. As may be seen, data processing system 60 includes processor 61 that preferably includes a graphics processor, memory device and central processor (not shown). Coupled to processor 61 is video display 62 which may be implemented utilizing either a color or monochromatic monitor, in a manner well known in the art. Also coupled to processor 61 is keyboard 63. Keyboard 63 preferably comprises a standard computer keyboard, which is coupled to the processor by means of cable 64. Also coupled to processor 61 is a graphical pointing device, such as mouse 65. Mouse 65 is coupled to processor 61, in a manner well known in the art, via cable 66. As is shown, mouse 65 may include left button 67, and right button 68, each of which may be depressed, or "clicked", to provide command and control signals to data processing system 60. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 60 may be implemented utilizing a personal computer.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs.

We claim:

1. A method for controlling access to a computer system device, being accessed through a special device file, with externally stored resources comprising the steps of:

retrieving file attributes for a device file resource used in the system device access attempt;

determining whether the resource that is making the access attempt is a special device file;

searching a mapping database for special device files that represent the system device that is the object of the access attempt and generating a special device file entry list of all protected device files that represent said system device; and generating an authorization decision for the access attempt to the system device based on the security policy that governs each device file in the special device file entry list.

2. The method as described in claim 1 further comprising before said searching step the step of terminating said access control method when the accessing resource is not a special device file.

3. The method as described in claim 1 further comprising after said searching step the step of terminating said access control method when said searching step did not find any database entries that had device specifications that match device specifications of the special device file making the access attempt.

4. The method as described in claim 1 wherein said searching step comprises the steps of: retrieving an entry from the mapping database;

comparing device specifications of the special device file making the access attempt to device specifications of the database entry; and comparing the file name of the special device file making the access attempt to the protected object name of the database entry.

5. The method as described in claim 4 further comprising after said file name comparison step the steps of: generating a device file entry list containing the database entry with the same file specification and file name as the device file making the access attempt; and terminating said searching step.

6. The method as described in claim 4 farther comprising after said file name comparison step the steps of placing in a file entry list, a mapping database entry having the same file specification as, but different file name from the special device file making the access attempt.

7. The method as described in claim 6 farther comprising the steps of:

determining whether there are more entries in the database;

retrieving a next mapping database entry for comparison with said special device file making the access attempt, when more entries are found in the mapping database; and returning to said special device file comparison step.

8. The method as described in claim 2 wherein said authorization decision step comprises the steps of:

retrieving the current entry in the special device file entry list;

calling the access decision component to obtain an access decision for the access attempt to the system device based on the security policy that governs the current entry in the device file entry list;

determining whether decision component granted access;

determining whether more entries are in said special device file entry list, if decision component granted access; and updating current entry in said special device file entry list and returning to said current entry retrieving step.

9. The method as described in claim 8 further comprising after said decision determination step the step of denying the access attempt to the system device if the decision component of a special device file entry denies access.

10. The method as described in claim 8 further comprising the step of allowing the access attempt to the system device if no more entries are in the special device file entry list.

11. A method for controlling access to a computing system device being accessed through a device file, said access control being through an externally stored resource and comprising the steps of:

monitoring the computing system for activities related to creating and accessing special device files that represent system devices;

restricting the creation of special device files based on rules defined in the externally stored resource; and restricting special device file accesses based on rules defined in the externally stored resource.

12. A computer program product in a computer readable storage medium for controlling access to a computer system device, being accessed through a special device file, with externally stored resources comprising the steps of:

instructions for retrieving file attributes for a device file resource used in the system device access attempt;

instructions for determining whether the resource that is making the access attempt is a special device file;

instructions for searching a mapping database for special device files that represent the system device that is the object of the access attempt and generating a device file entry list of all protected device files that represent said system device; and instructions for generating an authorization decision for the access attempt to the system device based on the security policy that governs each device file in the special device file entry list.

13. The computer program product as described in claim 12 wherein said instructions for searching a mapping database comprise:

instructions for retrieving an entry from the mapping database;

instructions for comparing the device specification of the special device file making the access attempt to the device specification of the database entry; and instructions for comparing the file name of the special device file making the access attempt to the protected object name of the database entry.

14. The computer program product as described in claim 13 further comprising after said file name comparison instructions: instructions for generating a special device file entry list containing the database entry with the same file specification and file name as the special device file making the access attempt; and instructions for terminating said searching instructions.

15. The computer program product as described in claim 13 further comprising after said file name comparison instructions the instructions for placing in a file entry list, a mapping database entry having the same file specification as, but different file name from the special device file making the access attempt.

16. The computer program product described in claim 15 further comprising:

instructions for determining whether there are more entries in the database;

instructions for retrieving the next mapping database entry for comparison with said special device file making the access attempt, when more entries are found in the mapping database; and instructions for returning to said special device file comparison step.

17. The computer program product as described in claim 12 wherein said authorization instructions comprise:

instructions for retrieving the current entry in the special device file entry list;

instructions for calling the access decision component to obtain an access decision for the access attempt to the system device based on the security policy that governs the current entry in the device file entry list;

instructions for determining whether decision component granted access;

instructions for determining whether more entries are in said special device file entry list, if decision component granted access; and instructions for updating current entry in said special device file entry list and returning to said current entry retrieving step.

18. The computer program product as described in claim 17 further comprising after said decision determination instructions the instructions for denying the access attempt to the system device if the decision component denies access.

19. The computer program product as described in claim 17 further comprising instructions for allowing the access attempt to the system device if no more entries are in the special device file entry list.

* * * * *